J. M. McGUIRE.
DIRIGIBLE HEADLIGHT FOR MOTOR VEHICLES.
APPLICATION FILED MAY 20, 1922.

1,434,392.

Patented Nov. 7, 1922.
2 SHEETS—SHEET 1.

Witnesses:

Inventor
James M. McGuire,
By Clarence A. O'Brien
Attorney

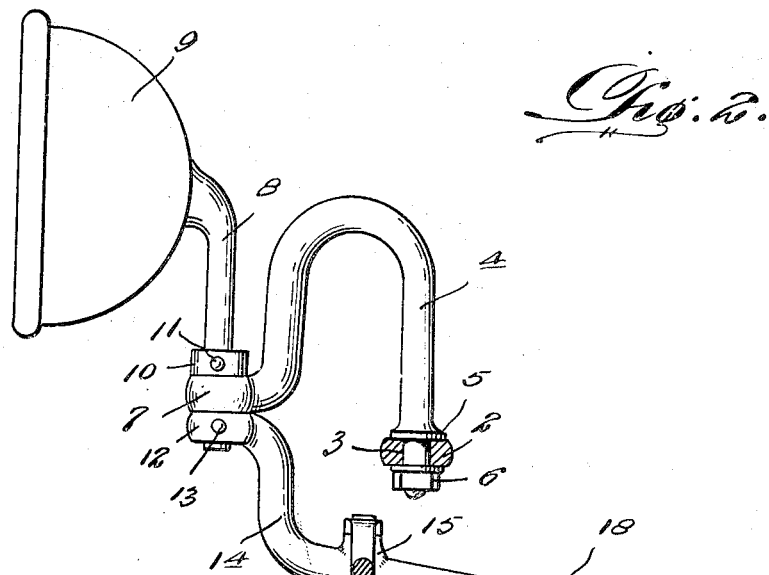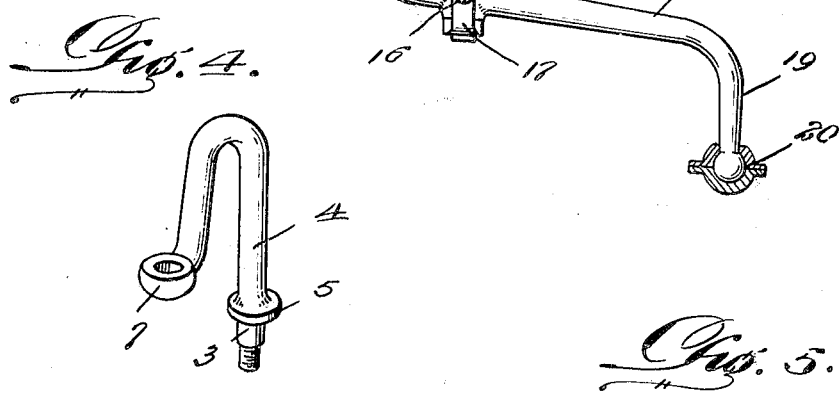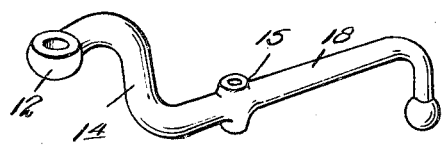

Patented Nov. 7, 1922.

1,434,392

UNITED STATES PATENT OFFICE.

JAMES MAXWELL McGUIRE, OF HAMILTON, ONTARIO, CANADA.

DIRIGIBLE HEADLIGHT FOR MOTOR VEHICLES.

Application filed May 20, 1922. Serial No. 562,544.

*To all whom it may concern:*

Be it known that I, JAMES M. McGUIRE, a subject of the King of Great Britain, residing at Hamilton, in the Province of Ontario and Dominion of Canada, have invented new and useful Improvements in Dirigible Headlights for Motor Vehicles, of which the following is a specification.

In carrying out the present invention it is my purpose to improve and simplify the general construction of dirigible headlights for motor vehicles and to provide dirigible headlights which will turn with the steering wheels of the vehicle, and wherein the component parts will be so arranged and corelated as to reduce the possibility of derangement to a minimum.

It is also my purpose to provide a dirigible headlight mechanism for motor vehicles which may be manufactured and sold at small cost, and which may be installed and maintained at little expense.

With the above recited objects in view, and others of a like nature, the invention resides in the construction, combination and arrangement of parts set forth in and falling within the scope of the appended claim.

In the accompanying drawings:

Figure 2 is a side elevation showing the mounting of one of the headlights.

Figures 4 and 5 are perspective views of details of the invention.

Figure 1:
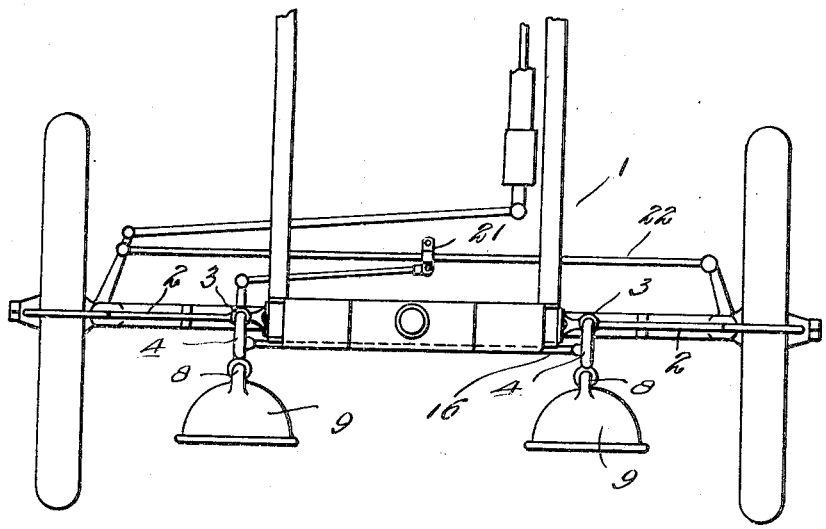
Figure 1 is a fragmentary top plan view of the front end of a motor vehicle showing my improved dirigible headlight mechanism applied thereto.
Figure 3:
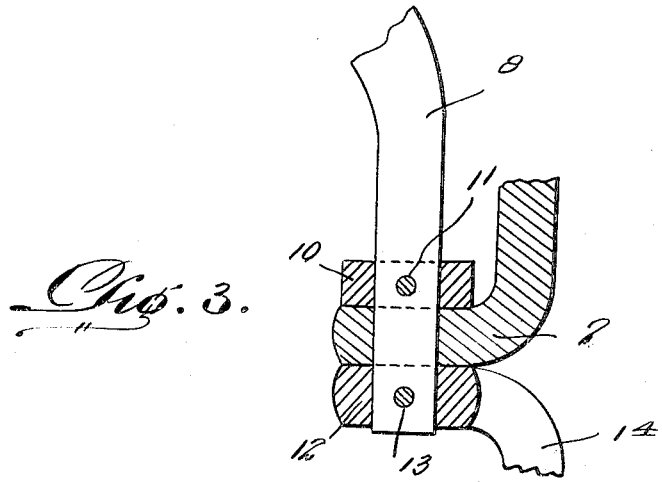
Figure 3 is an enlarged vertical sectional view showing the mounting of one of the headlight carrying posts.

Referring now to the drawings in detail, 1 designates the front end of a motor vehicle known as a Ford automobile, while 2 shows the usual fender braces secured to the side members of the frame and extending upwardly and outwardly from the front wheels of the vehicle and adapted to support the front fenders, as is well known.

At a point adjacent to the radiator, each fender brace 2 is formed with an eye 3 and fixed in each eye 3 is a goose-neck shaped rod 4 having the end within the eye formed above the eye with a flange 5 and the portion below the eye threaded to receive a nut 6, the nut 6 and flange 5 acting to clamp the goose-neck shaped arm 4 securely to the fender bracket 2. The other end of the goose-neck shaped arm or rod 4 is formed with an outwardly extending horizontally disposed eye portion 7 and rotatably mounted within the eye portion 7 is the lower end of a vertical lamp carrying post 8 on the upper end of which is mounted a head lamp 9.

Surrounding the rod 8 above the eye portion 7 is a collar 10 fixed to the rod by means of a cross pin 11 that passes through the collar and the rod, while surrounding the rod 8 below the eye portion 7 is a collar 12 fastened to the lower end of the rod by means of a pin 13. This collar 12 is formed integral with one end of an arm 14 that extends downwardly and terminates in a knuckle 15. The knuckles 15 on the arms 14 of the lamps are connected together by means of a tie rod 16 formed with yokes 17 at its respective ends that are pivotally connected with the knuckles 15, as illustrated in Figure 1 of the drawings, so that motion will be transmitted from one lamp to the other in order that both lamps will be turned in the turning of the steering wheels of the vehicle.

In order to accomplish this turning of the lamps one of the knuckles 15 is formed with a rearwardly extending arm 18 provided with a downturned end 19 connected by means of a ball and socket connection 20 with a block 21 that is connected with the tie rod 22 of the steering mechanism of the vehicle.

From the foregoing description, taken in connection with the accompanying drawings, it will be seen that when motion is imparted to the steering mechanism to steer the vehicle the tie rod 22 of such steering mechanism will operate, thereby transmitting motion from the block 21 to the arm 18, and this motion of the arm 18 is in turn transmitted to the arms 14 and the tie rod 16 of the posts 8, thereby rotating the posts within the eye portions 7 of the goose-neck shaft arms 4, thus turning the lamps in accordance with the wheels of the vehicle.

Having thus described the invention, what is claimed as new, is:—

In dirigible headlight mechanism for motor vehicles, the combination with goose-neck shaped arms fixed to the motor vehicle at opposite sides of the center thereof and formed respectively with outwardly extending horizontally disposed eye portions, lamp carrying posts journaled in said eye portions, collars fixed to each post above and below said outwardly extending horizontal eye portion, whereby said lamp carrying post will be maintained in said eye portion, arms connected to the lower collars, respectively, and extending rearwardly and formed with pivot knuckles, a tie rod connected to said pivot knuckles for imparting simultaneous movement of said lamp carrying posts, an arm formed on one of said knuckles and extending rearwardly therefrom and provided with a downturned end, a block connected to the tie rod of the steering mechanism of the vehicle, and a ball and socket connection between the downturned end of said arm and said block.

In testimony whereof I affix my signature.

JAMES MAXWELL McGUIRE.